United States Patent
Yoon

(10) Patent No.: US 12,411,980 B2
(45) Date of Patent: Sep. 9, 2025

(54) DATA MANAGEMENT COMPUTER, DATA MANAGEMENT SYSTEM INCLUDING THE DATA MANAGEMENT COMPUTER, AND METHOD THEREOF

(71) Applicant: Seong Min Yoon, Guri-si (KR)

(72) Inventor: Seong Min Yoon, Guri-si (KR)

(*) Notice: Subject to any disclaimer, the term of this patent is extended or adjusted under 35 U.S.C. 154(b) by 427 days.

(21) Appl. No.: 18/006,876

(22) PCT Filed: Jul. 23, 2021

(86) PCT No.: PCT/KR2021/009571
§ 371 (c)(1),
(2) Date: Jan. 26, 2023

(87) PCT Pub. No.: WO2022/025537
PCT Pub. Date: Feb. 3, 2022

(65) Prior Publication Data
US 2023/0274023 A1 Aug. 31, 2023

(30) Foreign Application Priority Data
Jul. 29, 2020 (KR) .................. 10-2020-0094418

(51) Int. Cl.
*G06F 21/62* (2013.01)
*G06F 21/31* (2013.01)
*G06F 21/60* (2013.01)
*G06F 40/284* (2020.01)

(52) U.S. Cl.
CPC .......... *G06F 21/6245* (2013.01); *G06F 21/31* (2013.01); *G06F 21/602* (2013.01); *G06F 40/284* (2020.01)

(58) Field of Classification Search
CPC ............... H04L 63/0428; H04L 63/062; H04L 67/1097; H04L 67/2823; H04L 67/2842
See application file for complete search history.

(56) References Cited

U.S. PATENT DOCUMENTS

2020/0342128 A1* 10/2020 Moll .................. H04L 63/0428

FOREIGN PATENT DOCUMENTS

| JP | 4594078 B2 | 12/2010 |
|---|---|---|
| KR | 10-0880243 B1 | 1/2009 |
| KR | 10-0910303 B1 | 8/2009 |
| KR | 10-1068654 B1 | 9/2011 |
| KR | 10-2017-0028194 A | 3/2017 |
| KR | 10-1771324 B1 | 8/2017 |
| KR | 10-2018-0029331 A | 3/2018 |
| KR | 10-2252861 B1 | 5/2021 |

* cited by examiner

*Primary Examiner* — Brian F Shaw

(57) ABSTRACT

The present invention relates to a data management computer and a data security system, and method thereof. In the present invention, a data management computer for processing encryption of at least one original data including computer hardware that causes the computer to perform: dividing each original data of at least one original data into a plurality of data elements and randomly assigning coordinate information to each of the divided data elements of at least one original data; encrypting at least one original data by separating each coordinate information assigned to a plurality of data elements into at least one piece; and assigning data information or arrangement information to each of the separated coordinate information and storing them.

15 Claims, 6 Drawing Sheets

FIG. 5

| Reference No. | Name | Birth day | Gender | Phone No. | Occupation | Address |
|---|---|---|---|---|---|---|
| 200721I321 | LEE, Jong Il | 19690212 | Male | 0109374790 | IP attorney | Jinyang Bd 3F 18 Dangsanro 27gil Yeongdeungpogu Seoul |
| 200721I322 | Park, Chul Soo | 19890224 | Male | 0105436 7421 | Business | BYC Bd. 504, 208 Yeoksamdong Gangnamgu Seoul |
| 200721I325 | Choi, Young Hee | 19890322 | Female | 0102111 7895 | Official | Banpo Zai Apt. 789-90 Banpodong 24bungil Gangnamgu Seoul |

| | | | | | | | | | | | | | | |
|---|---|---|---|---|---|---|---|---|---|---|---|---|---|---|
| Lee | Jong | Il | 1969 | 02 | 12 | Male | 010 | 9337 | 4790 | IP attorney | Jinyang Bd. | 3F | 18 | Dangsanro | 27gil | Yeongdeungpogu | Seoul |
| Park | Chul | Soo | 1989 | 02 | 24 | Male | 010 | 3456 | 7421 | Business | BYC Bd. | 504 | 208 | Yeoksamdong | Gangnamgu | Seoul |
| Choi | Young | Hee | 1989 | 03 | 22 | Female | 010 | 2111 | 7895 | Official | Banpo Zai Apt. | 789-90 | Banpodong | 24bungil | Gangnamgu | Seoul |

| | a | b | c | d | e | f | g | h | i | j | k | l |
|---|---|---|---|---|---|---|---|---|---|---|---|---|
| 01 | | | | | | | | | | | | |
| 02 | | 010 | Dangsanro | | | | | 4790 | | | | |
| 03 | | | | 1969 | | Lee | | | | | | |
| 04 | | | | | | | | | | | | |
| 05 | | | | | | 27gil | Seoul | | | | 9337 | |
| 06 | IP attorney | | | | | | | | | 02 | | |
| 07 | | | | | Male | | | | | | | |
| 08 | | Jinyang Bd. | | | | | | | | | | Yeongdeungpo |
| 09 | | | Jong | | 3F | | 12 | | 18 | | H | |
| 10 | | | | | | | | | | | | Seoul |

| f03 | e09 | k07 | d04 | j05 | g10 | e03 | b02 | k05 | h01 | g07 | c02 | i03 | a06 | f05 | l09 | b08 | e10 |

DATA MANAGEMENT COMPUTER, DATA MANAGEMENT SYSTEM INCLUDING THE DATA MANAGEMENT COMPUTER, AND METHOD THEREOF

BACKGROUND OF THE INVENTION

Technical Field

The present invention relates to a data security. More particularly, the present invention relates to a data management computer, data management system including the data management computer, and method thereof which converts security target information, including text information, audio information, image and video information of a specific person used online or offline, into data, performs encryption and decryption for security of the data, and manages it.

DESCRIPTION OF THE RELATED ART

Notifications using personal information such as an individual's name, phone number, and address are being used as an important marketing tool by companies. However, personal information is regulated by law so that it cannot be used recklessly for reasons such as personal privacy. Therefore, personal information manager of companies, etc., must obtain the consent of the person in use of the secured personal information, as well as thoroughly manage it to prevent external leakage.

Nevertheless, due to the indiscriminate use of personal information and leakage by hacking, the parties are suffering a lot of loss. In particular, as the online industry develops, not only personal information, but also various information such as audio, image, and video owned by a specific person require security. A lot of data security technologies for such various information have been developed, and various developed data security technologies are being used in the field.

Korean Patent No. 10-1771324 (registered date: Aug. 18, 2017) discloses an energy management system including open database and security database.

The patent invention includes a plurality of data generating devices for generating EMS basic data; a first database including a plurality of data blocks corresponding to each of the data generating devices and whose names are determined according to a preset naming rule as a block for storing the EMS basic data; a batch processor that generates EMS analysis data by reprocessing the EMS basic data according to the characteristics of each data generating device while including the first digital code for identifying the data generating device corresponding to each data block according to the naming rule; a second database that stores the EMS analysis data and is accessible according to an authentication procedure; and an EMS control unit for transmitting EMS display data to a user terminal or transmitting an EMS control command to a control target energy device according to the EMS analysis data.

The patent invention is to solve the security problem caused by the disclosure of the database by separately managing the public database and the security database.

Korean Patent No. 10-1068654 (registered date: Sep. 22, 2011) discloses a time capsule delivery system and time capsule delivery method.

The time capsule delivery method of the patent invention including: selecting one from a plurality of sequence combinations and information unit correspondence methods; matching information units to sequence combinations which is an artificial combination of sequence units of bases according to the selected method; encrypting the input information data by displaying as a nucleic acid sequence, which is a sequential combination of sequence units; verifying the correspondence methods of the sequence combination and the information unit from the nucleic acid sequence of the encrypted information; and extracting information data by analyzing the nucleic acid sequence by applying the identified correspondence method.

One of the above patented inventions is that open data and secure data are managed separately, and the other is an invention that sets a matching rule between a nucleic acid sequence and an information unit, encodes data according to the matching rule, and displays it as a combination of nucleic acid sequences.

However, the patented inventions have a problem in that data security fails when exposed to hacking of security databases and matching information of nucleic acid sequences and information units.

Therefore, it is desired to invent a data management computer for data security, a data security system including a data management computer, and a data security method in which even if data such as encrypted personal information is exposed to hacking, the data cannot be decrypted.

SUMMARY OF THE INVENTION

The present invention has been made in an effort to provide a data management computer, data management system including the data management computer, and method thereof that can perfect data security, including: dividing original data that requires security including personal information into a number of data elements by an intelligent algorithm; generating a divided data information by randomly arranging the divided data elements on the selected coordinate display means; extracting coordinate information of data elements disposed on the coordinate display means; generating coordinate array information by arranging the extracted coordinate information in the order of data elements of the original data; and storing the generated division data information and the coordinate array information in different storage media.

In addition, the present invention has been made in an effort to provide a data management computer, data management system including the data management computer, and method thereof that can perfect data security, including: generating a divided data information in which only the data in the selected range is divided into data elements and coordinate array information by using an intelligent algorithm, the range of data elements to be divided is divided into the entire data, main data, and type data in the original data; and storing the generated divided data information and the coordinate array information in different storage media.

In addition, the present invention has been made in an effort to provide a data management computer, data management system including the data management computer, and method thereof in which the information subject of the coordinate array information of the type data among the data of the selected range can obtain profits from the user of the coordinate array information of the type data.

According to a first aspect of the present invention, a data management computer including computer hardware that causes the computer to perform: dividing each original data into a plurality of data elements in at least one original data; randomly assigning coordinate information to each of the divided data elements; encrypting the original data by separating at least one piece of coordinate information each assigned to a plurality of data elements; giving each of data information or array information to separated coordinate information and storing them.

According to a second aspect of the present invention, a data security system includes a data management computer which manages original data, executes a program for converting the original data into divided data element information and data coordinate information, and manages at least one piece of coordinate display information; a data storage computer which is communicatively connected to or belongs to the data management computer, and storing and manages the original data, divided data element information and data coordinate information of the original data; at least one user terminal which is communicatively connected to the data management computer and inputs original data such as personal information, requests for restoration of data coordinate information of the original data converted by the data management computer, and executes a web program or computer program for confirming the restored original data; a cloud system which is communicatively connected to the data management computer, and stores and manages the original data, divided data element information, or data coordinate information in association with user information of the user terminal; and at least one utilizer terminal which is communicatively connected to the data management computer and executes a web program or computer program for utilizing the original data and performing payment.

According to a third aspect of the present invention, a data security method including: receiving and managing, by a data management computer, original data including text, voice, image, video or object information; generating, by the data management computer, divided data element information by dividing the original data into data elements such as syllable, word, or sentence unit; permanently deleting, by the data management computer, the original data; selecting or generating, by the data management computer, coordinate display means for arranging each data element of the divided data element information; generating, by the data management computer, data element array information by randomly arranging each data element of the divided data element information on the selected or generated coordinate display means; extracting, by the data management computer, each coordinate information of divided data element from the generated data element array information; generating, by the data management computer, data coordinate information arranged by matching each coordinate information of the extracted data elements with divided data elements of the divided data element information; permanently deleting, by the data management computer, the divided data element information; and storing, by the data management computer, the generated data element array information and the data coordinate information in different storage media.

According to the present invention, the original data is divided into data elements using an intelligent algorithm, the divided data elements are randomly arranged in coordinate display means, each coordinate information of the randomly arranged data elements is extracted, and the extracted coordinates are arranged the information in the order of data elements of the original data and storing the information and data coordinate information randomly arranged on the coordinate display means in different storage media, it is possible to ensure the security of the original data.

BRIEF DESCRIPTION OF DRAWINGS

FIG. 5 is an explanatory diagram for explaining the operation of the data management computer, which is a main part of the data security system of the present invention.

DETAILED DESCRIPTION

Figure 1:
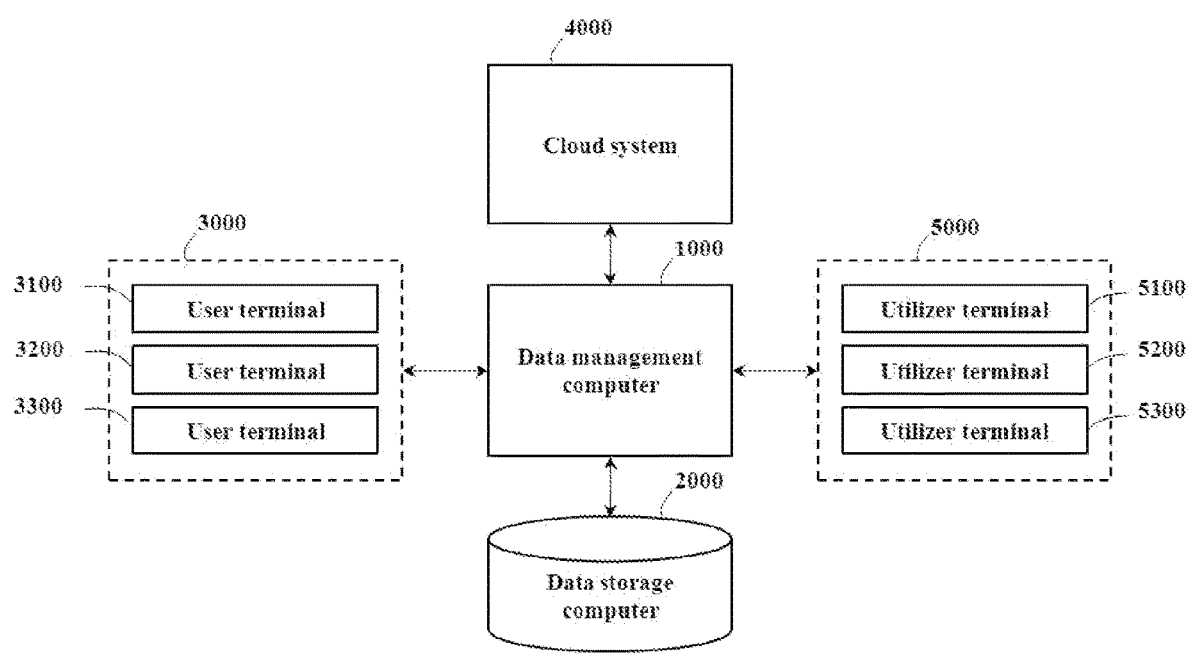
FIG. 1 is a schematic configuration diagram of an exemplary embodiment of a data security system of the present invention.

Hereinafter, exemplary embodiments of the present invention will be described in detail with reference to the accompanying drawings.

For convenience of the description of the exemplary embodiments of the present invention, among terms used in the description of the exemplary embodiments of the present invention to be described below, configurations of the present invention may refer to configurations of hardware itself and also refer to configurations of a web program or computer program executed by using the hardware resources. For example, a data management computer of the present invention may be configured of hardware included in the computer, and may be a configuration in which each component of a web program or computer program stored in a storage means of a computer is executed using hardware resources of a central processing unit (CPU) including instructions and algorithms stored in a computer.

In addition, '~unit', '~module' and '~means' used in the embodiments of the present invention may be used interchangeably as terms having the same meaning. The above terms may be hardware configurations of computers or terminals, and may represent each component of a web program or computer program stored in a storage means of a computer or terminal and executed under the control of a central processing unit (CPU) or processor. In the embodiment of the present invention, the above terms are mainly used as terms that cause hardware resources of a computer to execute each component of a web program or computer program. That is, it is preferable to see that the meaning of the function and action of the term rather than the meaning of the term used in the embodiment of the present invention.

In addition, terms or expressions not defined herein are not bound by the terms or expressions, and of course have a greater meaning in the action or function of the indicated component.

In addition, in this specification, when one component is referred to as "connected" to another component, the one component may be directly connected or directly connected to the other component, but in particular unless otherwise described, it should be understood that they may be connected or connected via another component in the middle. In addition, in the present specification, components expressed as "~unit" or "~module" may be two or more components combined into one component, or one component divided into two or more for each more subdivided function. In addition, each of the components to be described below may additionally perform some or all of the functions of other components in addition to its own main function. In addition, of course, some of the main functions of each component may be exclusively performed by other components.

Also, the term "~unit" or "~module" used in this specification may include software, hardware, or a combination thereof depending on the context in which the term is used. Software may be, for example, machine code, firmware, embedded code, application software, or combinations thereof.

Also, the hardware may be, for example, a circuit, a processor, a computer, an integrated circuit, integrated circuit cores, a pressure sensor, an inertial sensor, a micro electro mechanical system (MEMS), passive components, or a combination thereof. When "~unit" or "~module" is recited in the claims, it is intended to cover the claims and utilization of hardware resources for that purpose.

FIG. 1 is a schematic configuration diagram of an exemplary embodiment of a data security system of the present invention.

As illustrated in FIG. 1, the data security system of the present invention is a configuration including a data management computer 1000 which manages original data, executes a program for converting the original data into divided data element information and data coordinate information, and manages at least one piece of coordinate display information; a data storage computer 2000 which is communicatively connected to or belongs to the data management computer 1000, and storing and manages the original data, divided data element information and data coordinate information of the original data; at least one user terminal 3000 which is communicatively connected to the data management computer 1000 and inputs original data such as personal information, requests for restoration of data coordinate information of the original data converted by the data management computer 1000, and executes a web program or computer program for confirming the restored original data; a cloud system 4000 which is communicatively connected to the data management computer 1000, and stores and manages the original data, divided data element information, or data coordinate information in association with user information of the user terminal 3000; and at least one utilizer terminal 5000 which is communicatively connected to the data management computer 1000 and executes a web program or computer program for utilizing the original data and performing payment.

The data management computer 1000 includes communication means such as wired or wireless Internet, at least one central processing unit (CPU) having an arithmetic algorithm (ALU), registers, and a control unit, and a data storage device such as a memory for storing a web program or computer program executed by commands of the central processing unit and a hard driver for storing various data obtained in the process of executing the program. Also, the data management computer 1000 may be configured as a server computer.

The data storage computer 2000 may be a storage device included in the data management computer 1000, and preferably may be configured as an independent server system (DBMS) that manages a database.

The user terminal 3000 and the utilizer terminal 5000 are may be configured of personal computers (PCs), notebook computers, portable terminals such as smartphones, and terminals such as tablet computers which capable of communication access to the data management computer 1000 or the cloud system 4000 and executing web programs or computer programs.

The cloud system 4000 may be configured of commercially available or self-constructed computing systems which is equipped with various storage devices and means for executing programs, and is provided with communication connection means with the data management computer 1000, the user terminal 3000 and the utilizer terminal 5000.

Figure 2:
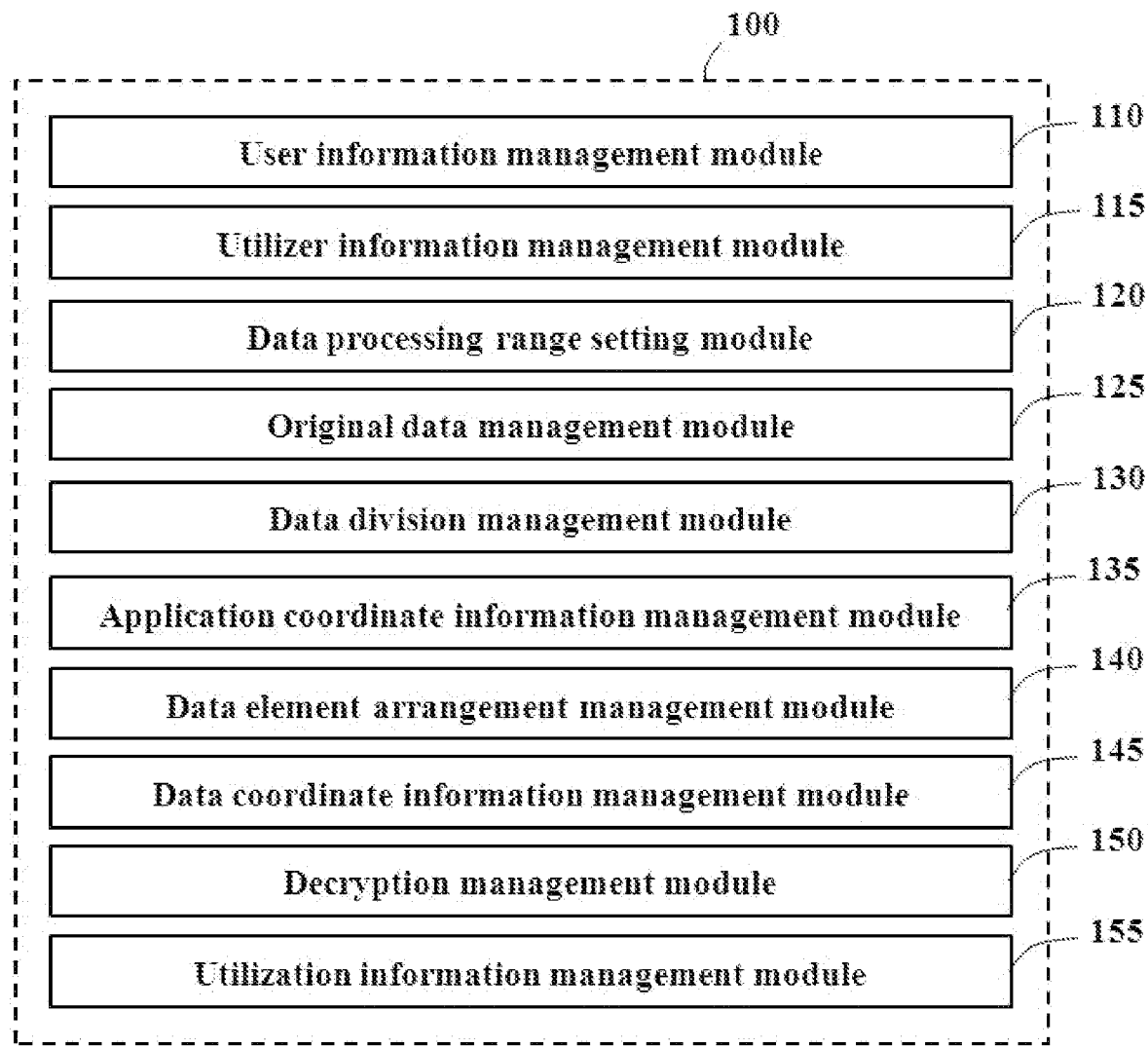
FIG. 2 is a schematic configuration diagram of an embodiment of a program stored in the memory of a data management computer, which is a main part of the data security system of the present invention.

FIG. 2 is a schematic configuration diagram of an embodiment of a program stored in the memory of a data management computer, which is a main part of the data security system of the present invention.

The embodiment of the data management computer 1000 of FIG. 2 is data management means composed of components of a web program or computer program that is executed by utilizing hardware resources of at least one processor and memory included in the data management computer 1000.

As illustrated in FIG. 2, the data management means 100 stored and executed in the data management computer 1000 of the present invention includes a user information management module 110 which receives and manages basic personal information such as names (titles), phone number and address entered by users who want the security of the data, and user information such as ID and password (PW) for system access; a utilize information management module 115 which receives and manages basic information such as names (titles), phone numbers and addresses entered by utilizers who want to utilize the users' data; a data processing range setting module 120 which sets the range of division and coordinate processing among the contents of the data to the entire data, personal information or only the type of personal information among the data; an original data management module 125 which receives security targets transmitted from user terminals or provided by users, and manages them as original data; a data division management module 130 which generates and manages data elements by dividing the original data into syllables, words, or sentences according to the processing range set by the data processing range setting module 120; an application coordinate information management module 135 which generates coordinate display means for arranging data elements obtained by dividing the original data, and manages set ones; a data element arrangement management module 140 which generates and manages data element arrangement information by fetching an arbitrary coordinate display means from the applied coordinate information management module 135 and randomly arranging the data elements; a data coordinate information management module 145 which extracts coordinate information of each data element from the data element arrangement information, and generates and manages data coordinate information arranged in the order of the data elements managed by the data division management module 130; a decryption management module 150 which decrypts and manages the data coordinate information as data included in the original data when the data is to be utilized due to the need of the information subject who provided the original data or at the request of the user; and a utilization information management module 155 which stores and manages data utilization information of information subjects or users of the original data.

Figure 3:
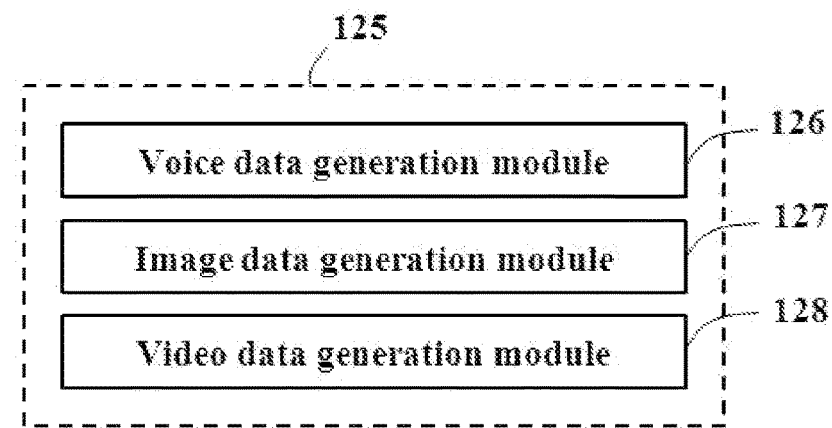
FIG. 3 is a schematic configuration diagram of an embodiment of the original data management module of FIG. 2.

FIG. 3 is a schematic configuration diagram of an embodiment of the original data management module of the data management computer of the present invention.

As illustrated in FIG. 3, the original data management module 125 of the present invention includes a voice data generation module 126 which generates and manages a converted audio file or provided audio file as predetermined data when the security target provided by the user is audio; an image data generation module 127 which generates and manages a converted image file or provided image file as predetermined data when the security target provided by the user is an object; and a video data generation module 128 which generates and manages a provided video file as predetermined data when the security target provided by the user is a video file such as a still image or moving image.

The data management computer stores the data generated by the audio data generation module 126, the image data generation module 127, and the video data generation module 128 the audio file, image file, or video file in association with a predetermined data file, and the associated data files may be configured to perform the processing described above.

Figure 4:
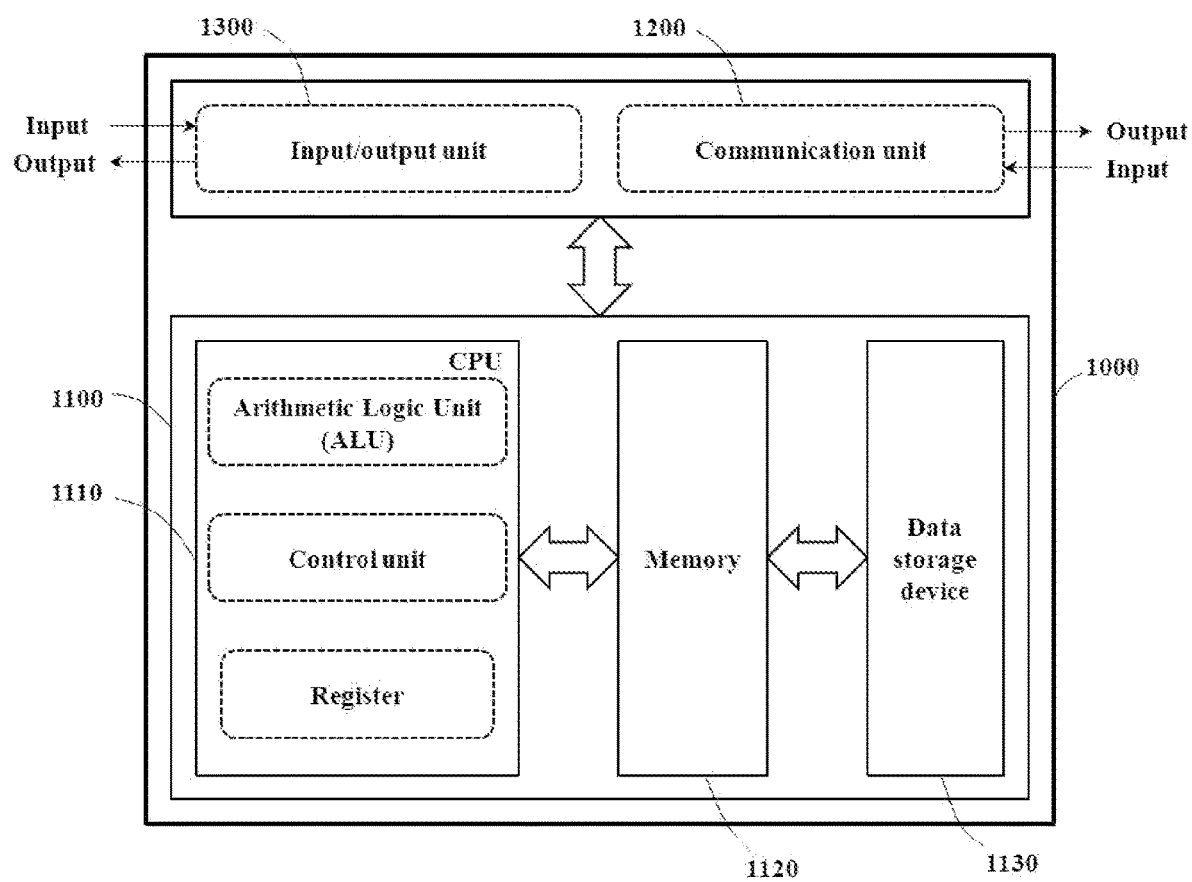
FIG. 4 is a schematic configuration diagram of the hardware of the data management computer, which is the main part of the data security system of the present invention.

FIG. 4 is a schematic configuration diagram of the hardware of the data management computer, which is the main part of the data security system of the present invention.

As illustrated in FIG. 4, the hardware of the data management computer includes a communication and control device 1100 including as a device that instructs and controls the operation of all components of the data management computer 1000, a control unit which deciphers the command read from the command register and sends a control signal to the corresponding component to instruct it to perform accurately; an Arithmetic Logic Unit (ALU) including an adder, an accumulator, a complementor, a data register, an overflow detector, a shift register, and the like that actually performs arithmetic, logical, and relational operations according to the command of the control unit; a central processing unit (CPU) 1110 including a register that temporarily stores an intermediate value of a command or operation to be processed by the program counter, command register, command decoder, encoder, memory address register, and memory buffer register; a memory 1120 for storing a web program or computer program executed under the control of the central processing unit which converts original data such as data, voice, image, and video provided by the user into data element arrangement information and data coordinate information, and restores the data coordinate information into original data; and a data storage device 1130 for storing various data including the data element arrangement information or data coordinate information, a communication unit 1200 communicating with peripheral devices such as the communication and control device 1100, the user terminal 3000, and the cloud system 4000, and an input/output unit 1300 connecting a peripheral device for inputting and outputting data to the communication and control device 1100.

FIG. 5 is an explanatory diagram for explaining the operation of the data management computer, which is a main part of the data security system of the present invention.

As illustrated, FIG. 5 takes personal information of an information subject as an example of a security subject for convenience.

An original data management module 125 of the data management computer 1000 receives the original data as a security target personal information such as name, date of birth, gender, phone number, occupation, and address inputted in the input fields of user interface of the user terminal by the user, assigns a management number to the original data, and lists and manages the original data. A data division management module 130 divides the original data into syllable, word, number, or sentence unit data elements using an intelligent algorithm to generate divided data element information. An applied coordinate information management module 135 generates coordinate display means to arrange the divided data elements or retrieves and provides stored coordinate display means. A data element arrangement management module 140 randomly arranges the data elements on the provided coordinate display means to generate data element arrangement information. A data coordinate information management module 145 extracts the coordinate information of each data element from the data element arrangement information generated by the data element arrangement management module 140, arranges the coordinate information of each data element extracted in the order of each data element of the divided data element information on the data division management module 130, and generates a data coordinate information.

An example of FIG. 5 will be described. Personal information received by the original data management module 125 is Lee Jong II (name), 1969 Feb. 12 (date of birth), male (gender), 010-9337-4790 (phone number), a patent (IP) attorney (occupation), 3rd floor, Jinyang Building, 18 Dangsanro 27gil, Yeongdeungpogu, Seoul (address), and various other data. Among the personal information data, the range to be subject to security is set from name to address using set rules or intelligent algorithms. By driving the data division management module 130 or the intelligent algorithm, the original data from the name to the address is divided into data elements including syllables, numbers, or words such as 'Lee', 'Jong', 'II', 'Male', '1969', '02', '12', ' 010', '9337', and '4790'. In addition, the address divides each word into data elements. Next, an array of divided data elements is generated.

Of course, in the above example, the division is based on syllables, existing numbers, and words, but it is not limited thereto, and all original data is divided into only syllables and single numbers to generate information in which the divided data elements are arranged.

The applied coordinate information management module 135 may retrieve and provide at least one stored coordinate display means according to a set rule or arbitrarily, and may generate and provide coordinate display means.

The data element arrangement management module 140, when the coordinate display means provided from the application coordinate information management module 135 is an arrangement of lowercase letters in the horizontal direction and a sequential arrangement of numbers in the vertical direction in FIG. 5, each of the divided data elements of the original data are randomly arranged on the coordinate display means.

As in the example of FIG. 5, among the names, 'Lee' is randomly arranged as f03, 'Jong' as c09, and 'II' as k07. The data elements may be randomly arranged using an intelligent algorithm.

The data coordinate information management module 145 extracts coordinate information of each data element disposed on the coordinate display means, matches the coordinate information of the extracted data elements and the arrangement information of the divided data elements generated by the data division management module 130, and arranges and generates the data coordinate information such as 'f03, c09, k07, d04, i05 . . . ' of FIG. 5.

To check the original data by restoring the data coordinate information of the original data, a provider of personal information can check by accessing the data management computer 1000. In this case, the data management computer 1000 may restore and provide the data coordinate information as original data through user authentication of the provider of personal information.

However, the file of the data element and the file of the data coordinate information arranged in the coordinate display means may be stored in different storage media. For example, the file of the data element arranged in the coordinate display means is stored in the storage space of the cloud system (4000) linked to user information, which is the provider of the original data, and the file of the data coordinate information is stored in the data storage computer 2000 or stored in the storage space of the cloud system 4000 associated with system information.

Hereinafter, the operation of the data security system of the present invention will be described with reference to FIGS. 1 to 5 described above.

The present invention divides, for example, the contents of original data including personal information into syllables, numbers, words, and sentences, generates data elements, and randomly arranges and coordinates each data element using a program in which horizontal and vertical coordinates are displayed, extracts only the coordinate information of each data element and makes the data coordinate information into a separate file, and performs the data security so that the original data of the original file from which the coordinate information is extracted cannot be recognized.

Here, after generating data elements and extracting the coordinate information of each data element, it is necessary to delete all existing data that can recognize the original data. That is, referring to FIG. 5, the component 125 and component 130 are deleted at the same time or immediately after the component 140 in which the data elements of the original data are randomly arranged and the component 145 having the coordinate information of the original data are generated or extracted as separate files. The contents of the original data cannot be grasped with only one of the components 140 or 145. However, when components 140 and 145 are combined, the same contents as those of the original data can be decrypted.

Deleting all data that can recognize the original data as described above is because data security cannot be maintained when specific data, files, or materials are exposed by hacking. Preferably, even when the original data is decrypted and the contents are checked, it is possible to contribute to data security by allowing the contents to be read and confirmed only under certain circumstances or conditions, and not storing or outputting the decrypted contents in a specific space or physical space.

In addition, the information subject (individual) and the data management computer can separate and store files of data coordinate information having data element information and coordinate information randomly arranged on the coordinate display means. For example, the information of the data elements randomly arranged on the coordinate display means can be stored by the user himself, and the file of the data coordinate information can be stored in the data management computer, or the file can be changed and stored separately. In this case, each file can be stored in the cloud system 4000.

In addition, security can be further enhanced by arbitrarily dividing the contents of the data element information randomly arranged in the coordinate display means and dividing them into several files and storing them. For example, in the case of a coordinate display means having a horizontal arrangement of lowercase letters and a vertical arrangement of numbers. The present invention separates and extracts only the contents of odd or even columns horizontally or vertically, and stores them as separate files. In addition, in the present invention, in order to combine the separated and extracted files, they can be encrypted with information linked to each other to generate and store file names.

In addition, when the information of the data elements randomly arranged in the coordinate display means is stored in the user storage space of the cloud system 4000, in order to confirm the original data, when the user, information provider, inputs a password, such as a password set in the data management computer 1000 or the cloud system 4000 in the data elements information randomly arranged in the coordinate display means, the information form of data elements randomly arranged in the coordinate display means can be confirmed.

Meanwhile, the user who is the information provider of the original data can access the data management computer 1000 and verify the original data through user authentication. In this case, the data management computer 1000 decrypts the data coordinate information by using the information of data elements randomly arranged in the coordinate display means of the cloud system 4000 stored in association with the data coordinate information of the stored original data and can confirm the original data. In this case, when the decrypted original data file is stored or moved to another place, it may be configured to be stored or moved only in an encrypted state (eg, data coordinate information before restoration).

In addition, the data processing range setting module 120 can be set separately the original data such as the entire contents, personal information, and personal type information which for example, displays only as a type or range such as a 40-generation male in the Seoul area so that the individual is not specified among personal information.

In this case, when the information is provided to the utilizer terminal for the personal type information essential for the data industry and commercial use, the information subject can take profits according to the provision of the information for use.

Figure 6:
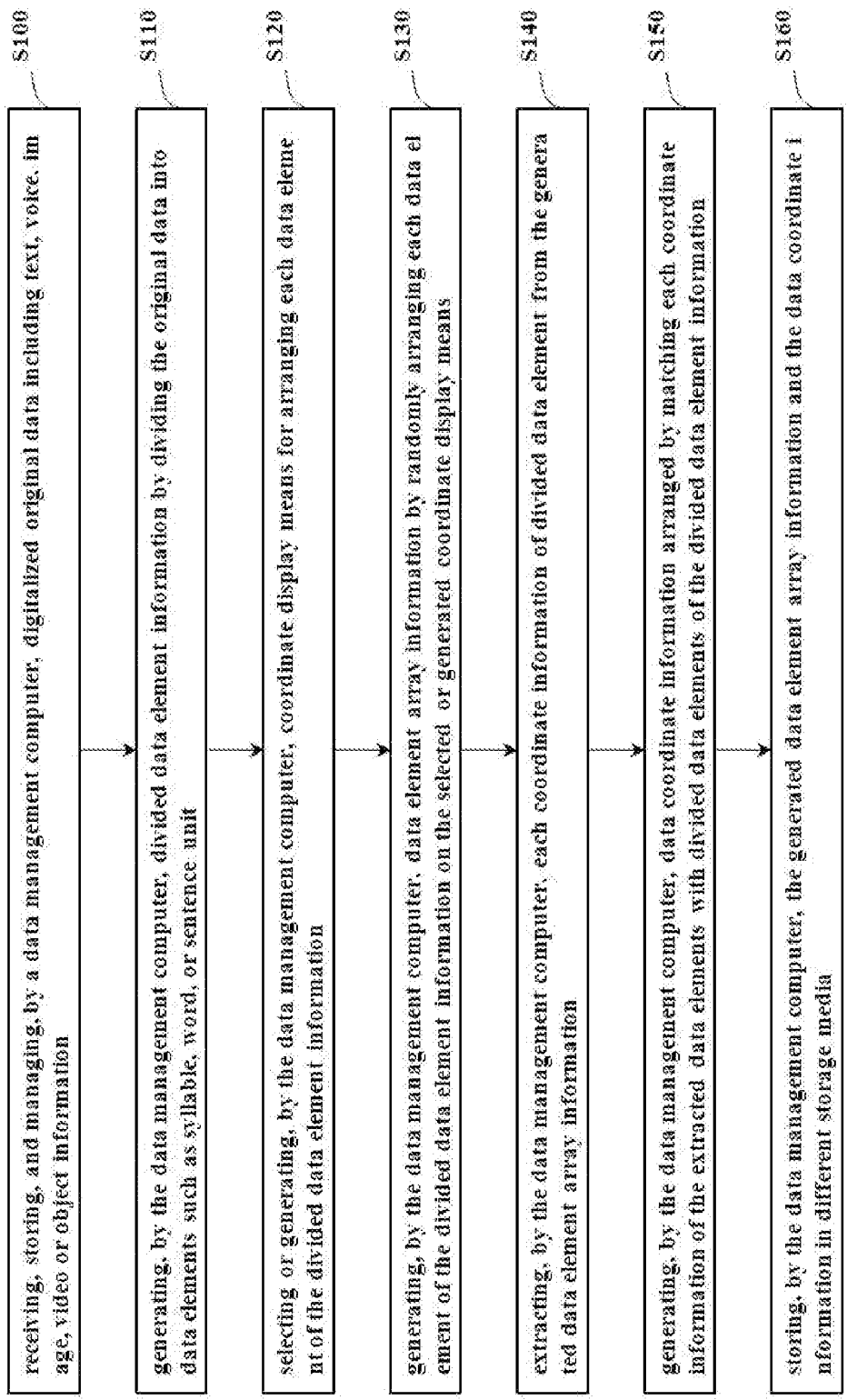
FIG. 6 is a flowchart for describing embodiment of a data security method of the present invention.

FIG. 6 is a flowchart for describing embodiment of a data security method of the present invention.

As illustrated in FIG. 6, the data security method of the present invention including: receiving, storing, and managing, by a data management computer, digitalized original data including text, voice, image, video or object information (S100); generating, by the data management computer, divided data element information by dividing the original data into data elements such as syllable, word, or sentence unit (S110); selecting or generating, by the data management computer, coordinate display means for arranging each data element of the divided data element information (S120); generating, by the data management computer, data element array information by randomly arranging each data element of the divided data element information on the selected or generated coordinate display means (S130); extracting, by the data management computer, each coordinate information of divided data element from the generated data element array information (S140); generating, by the data management computer, data coordinate information arranged by matching each coordinate information of the extracted data elements with divided data elements of the divided data element information (S150); and storing, by the data management computer, the generated data element array information and the data coordinate information in different storage media (S160).

In addition, the data security method of the present invention may further include, deleting, by the data management computer, the original data after generating divided data element information; and deleting, by the data management computer, the divided data element information after generating the data coordinate information.

In addition, the data security method of the present invention may further include, deleting, by the data management computer, the original data and divided data element information after generating the data coordinate information.

Figure 7:
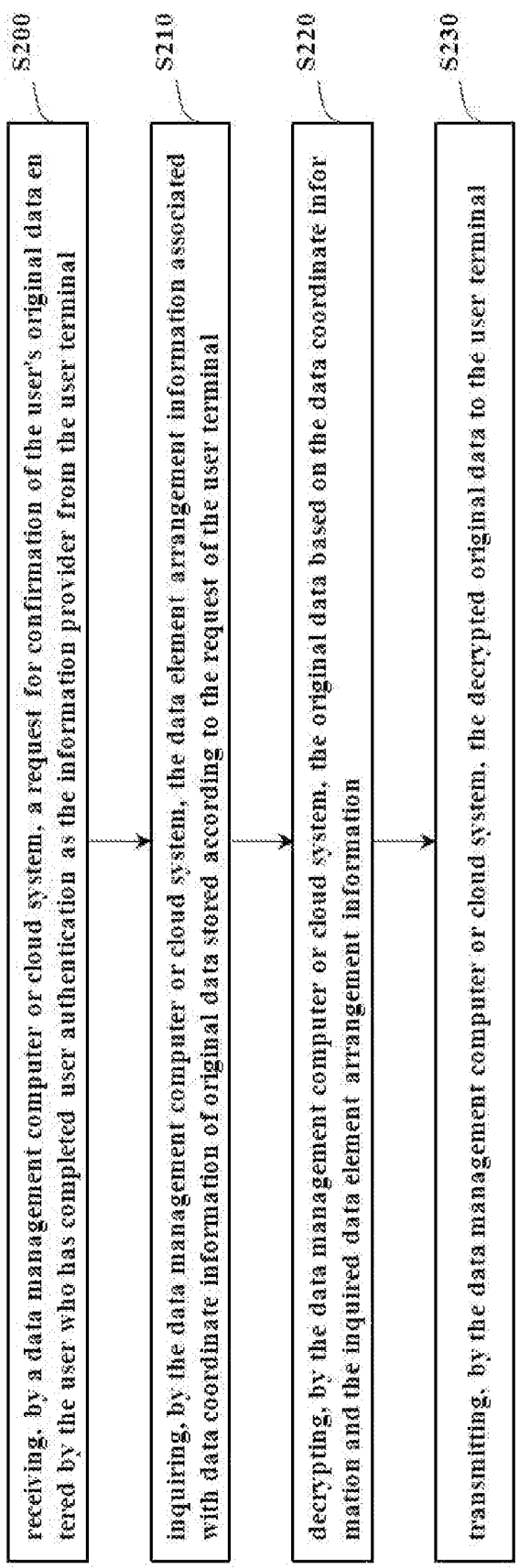
FIG. 7 is a flowchart for describing another embodiment of data security method of the present invention.

FIG. 7 is a flowchart for describing another embodiment of data security method of the present invention.

AS illustrated in FIG. 7, the data security method of the present invention including: receiving, by a data management computer or cloud system, a request for confirmation of the user's original data entered by the user who has completed user authentication as the information provider from the user terminal (S200); inquiring, by the data management computer or cloud system, the data element arrangement information associated with data coordinate information of original data stored according to the request of the user terminal (S210); decrypting, by the data management computer or cloud system, the original data based on the data coordinate information and the inquired data element arrangement information (S220); and transmitting, by the data management computer or cloud system, the decrypted original data to the user terminal (S230).

The embodiments of the present invention described above are only some of various embodiments of the present invention.

Various embodiments included in the technical idea of receiving digitalized original data including text, voice, image, video or object information; generating divided data element information by dividing the original data into data elements such as syllable, word, or sentence unit; selecting or generating coordinate display means for arranging each data element of the divided data element information; generating data element array information by randomly arranging each data element of the divided data element information on the selected or generated coordinate display means; extracting each coordinate information of divided data element from the generated data element array information; and generating data coordinate information arranged by matching each coordinate information of the extracted data elements with divided data elements of the divided data element information are naturally included in the protection scope of the present invention.

What is claimed is:

1. A data management computer for processing encryption of at least one original data including computer hardware that causes the computer to perform:
dividing each original data of at least one original data into a plurality of data elements and randomly assigning coordinate information to each of the divided data elements of at least one original data;
encrypting at least one original data by separating each coordinate information assigned to a plurality of data elements into at least one piece; and
assigning data information or arrangement information to each of the separated coordinate information and storing them.

2. The data management computer of claim 1, wherein the coordinate information is information generated by a coordinate display means consisting of a plurality of rows and columns and having different symbols assigned to each row and column, and wherein separating each coordinate information assigned to the plurality of data elements into at least one piece is separating the coordinate information of a specific column or specific row of a coordinate display means.

3. The data management computer of claim 1, wherein the separated coordinate information is encrypted.

4. The data management computer of claim 1, wherein when the encrypted original data is used by a utilizer, provides predetermined profit to the provider of the original data.

5. A data security method using data management computer processing encryption of at least one original data comprising:
dividing, a data management computer, each original data of at least one original data into a plurality of data elements and randomly assigning coordinate information to each of the divided data elements of at least one original data;
encrypting, a data management computer, at least one original data by separating each coordinate information assigned to a plurality of data elements into at least one piece;
assigning, a data management computer, data information or arrangement information to each of the separated coordinate information and storing them.

6. A system for data security comprising:
a data management computer including computer hardware that causes the system to perform:
receiving a plurality of original data corresponding to security objects provided by users;
dividing each original data of the plurality of original data into data elements and generating divided data element information in which the divided data elements are arranged for each original data;
generating data element arrangement information by randomly arranging data elements for each original data included in the divided data element information in one coordinate display means having a plurality of rows and columns and capable of assigning coordinates to each row and column;
generating data coordinate information including information of a plurality of data coordinates arranged in the order of data elements of the original data by extracting coordinate information of data elements corresponding to each original data from the data element arrangement information; and
deleting the plurality of original data and the divided data element information.

7. The system for data security of claim 6, further comprising: receiving and managing basic personal information such as names (titles), phone number and address entered by users who want the security of the data, and user information such as ID and password (PW) for system access; and receiving and managing basic information such as names (titles), phone numbers and addresses entered by utilizers who want to utilize the users' data.

8. The system for data security of claim 6, wherein the data management computer further comprising: setting a data range for generating data coordinate information for each original data of the plurality of original data.

9. The system for data security of claim 6, wherein the division of the plurality of original data into data elements is to divide the original data into units such as syllables, numbers, words, or sentences.

10. The system for data security of claim 6, wherein the one coordinate display means is generated or set in advance.

11. The system for data security of claim 6, wherein when the data is to be used due to the need of the information subject who provided the original data or at the request of the user, the data management computer decrypts the data included in the original data based on the coordinate information of the data coordinate information, and provides to the information provider or utilizer.

12. The system for data security of claim 6, further comprising: receiving and managing utilization information of decrypted original data of information providers or utilizers of the original data.

13. The system for data security of claim 12 further comprises a user interface capable of confirming the original data by being output to the user terminal of the information provider of the original data or the utilizer terminals of the utilizers.

14. A data security method comprising:
- Receiving, by a data management computer, a plurality of original data corresponding to security objects provided by users;
- dividing, by the data management computer, each original data of the plurality of original data into data elements and generating divided data element information in which the divided data elements are arranged for each original data;
- generating, by the data management computer, data element arrangement information by randomly arranging data elements for each original data included in the divided data element information in one coordinate display means having a plurality of rows and columns and capable of assigning coordinates to each row and column;
- generating, by the data management computer, data coordinate information including information of a plurality of data coordinates arranged in the order of data elements of the original data by extracting coordinate information of data elements corresponding to each original data from the data element arrangement information; and
- deleting, by the data management computer, the plurality of original data and the divided data element information.

15. The data security method of claim 14, further comprising:
- receiving, by the data management computer, a request for confirmation of the user's original data entered by the user who has completed user authentication as the information provider from the user terminal;
- inquiring, by the data management computer, the data element arrangement information associated with data coordinate information of original data stored according to the request of the user terminal;
- decrypting, by the data management computer, the original data based on the data coordinate information and the inquired data element arrangement information; and
- transmitting, by the data management computer, the decrypted original data to the user terminal.

* * * * *